(12) United States Patent
Beckwith et al.

(10) Patent No.: US 11,577,767 B2
(45) Date of Patent: Feb. 14, 2023

(54) MODULAR STORAGE SYSTEM

(71) Applicant: OLYMPIA TOOLS INTERNATIONAL, INC., Covina, CA (US)

(72) Inventors: Jonathan S. Beckwith, Durham, NC (US); Cecil Wilson, Sanford, NC (US)

(73) Assignee: Olympia Tools International, Inc., Covina, CA (US)

( * ) Notice: Subject to any disclaimer, the term of this patent is extended or adjusted under 35 U.S.C. 154(b) by 0 days.

(21) Appl. No.: 17/036,032

(22) Filed: Sep. 29, 2020

(65) Prior Publication Data

US 2022/0097747 A1 Mar. 31, 2022

(51) Int. Cl.
*B62B 3/02* (2006.01)
*B62B 5/06* (2006.01)

(52) U.S. Cl.
CPC ............... *B62B 3/02* (2013.01); *B62B 5/067* (2013.01)

(58) Field of Classification Search
CPC .................................. B62B 3/02; B62B 5/067
See application file for complete search history.

(56) References Cited

U.S. PATENT DOCUMENTS

| | | | | |
|---|---|---|---|---|
| 5,078,530 A * | 1/1992 | Kim | ................. | E04D 3/366 403/24 |
| 6,085,668 A | 7/2000 | Kanki | | |
| 9,592,955 B2 * | 3/2017 | Baik | ................. | B65D 90/0006 |
| 2013/0234576 A1 | 9/2013 | Hixson | | |

FOREIGN PATENT DOCUMENTS

| | | |
|---|---|---|
| CH | 714511 A2 | 6/2019 |
| DE | 29906801 U1 | 9/1999 |
| TW | M541238 U | 5/2017 |

OTHER PUBLICATIONS

Gladiator Garage Storage System, https://www.gladiatorgarageworks.com/, accessed Aug. 23, 2021.
Kobalt Cabinets and K-rail System, https://www.lowes.com/collections/Kobalt-Tool-Garage-Storage/GR_1786, accessed Aug. 23, 2021.
NewAge Garage Cabinets, https://newageproducts.com/garage-storage-cabinets/, accessed Aug. 23, 2021.
International Search Report and Written Opinion in related application PCT/US2021/052554 dated Jan. 21, 2022.
Taiwan Office Action dated Apr. 22, 2022, for Taiwan Patent Application No. 110136218.

* cited by examiner

*Primary Examiner* — James A English
*Assistant Examiner* — James J Triggs
(74) *Attorney, Agent, or Firm* — Patterson + Sheridan, LLP

(57) ABSTRACT

A modular storage system includes a unit body having a first lateral end, a second lateral end opposite the first lateral end, and an upper surface extending between the first and second lateral ends. The unit body includes a first groove formed in the upper surface at the first lateral end and a first groove connector in the first groove. The system includes a tongue piece having a first and second side. Each of the first and second sides of the tongue piece has a shape corresponding to the first groove and a tongue connector configured to releasably engage the first groove connector.

20 Claims, 10 Drawing Sheets

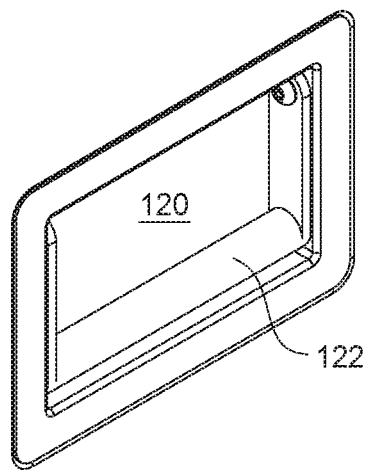
FIG. 1E
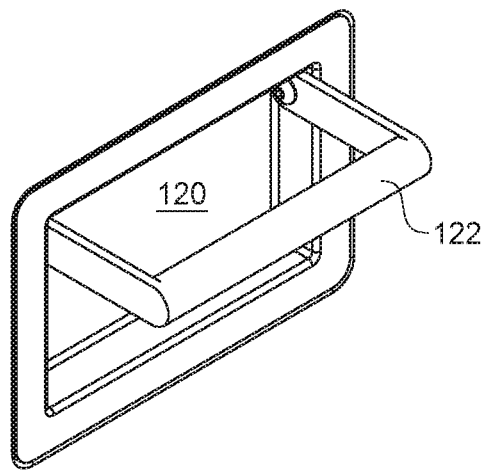
FIG. 1F
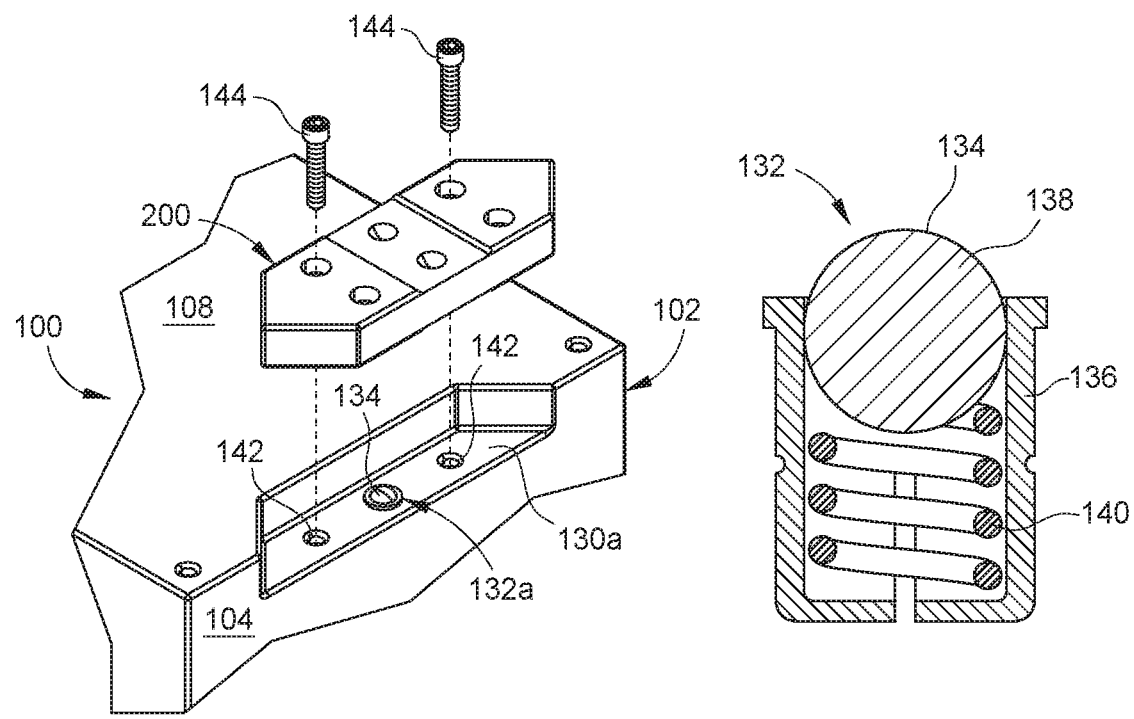
FIG. 1G
FIG. 1H

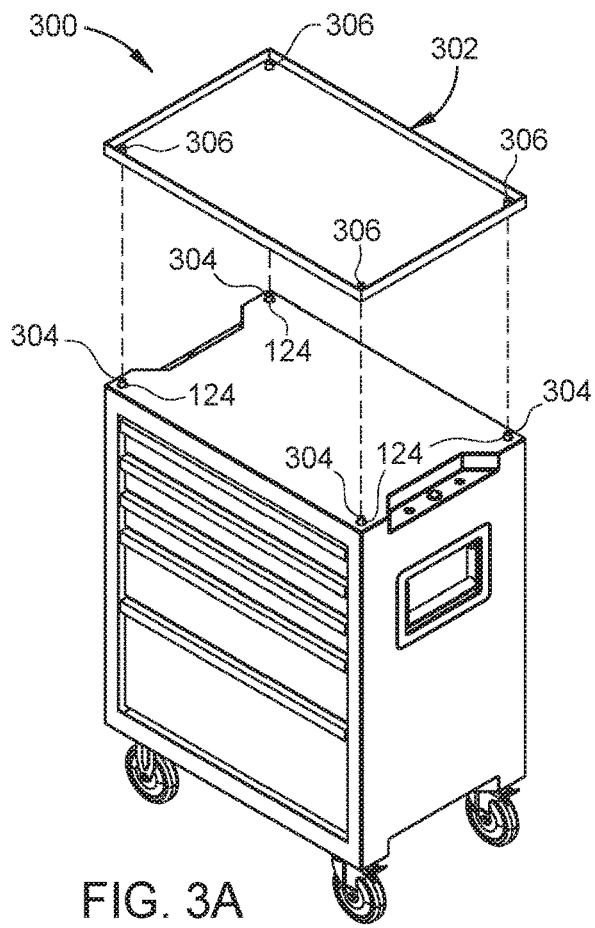
FIG. 3A
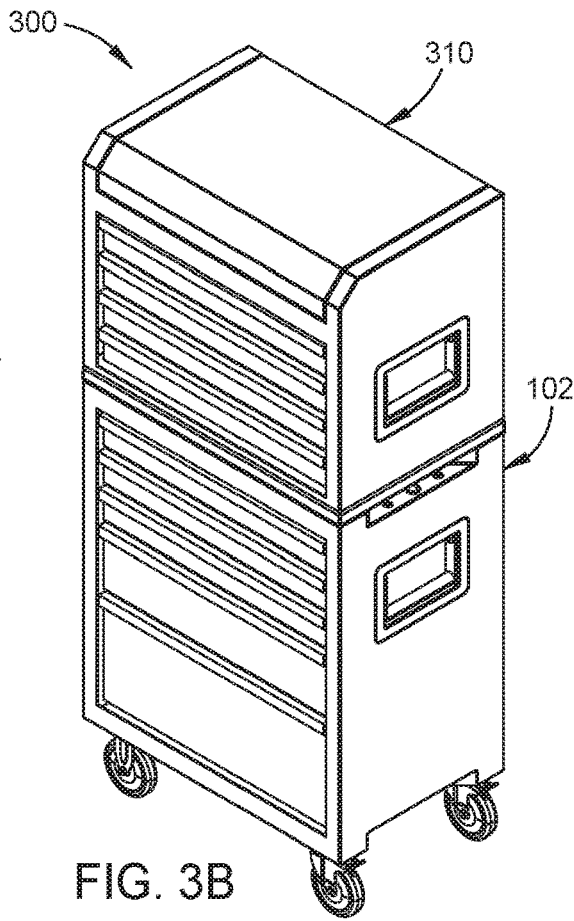
FIG. 3B
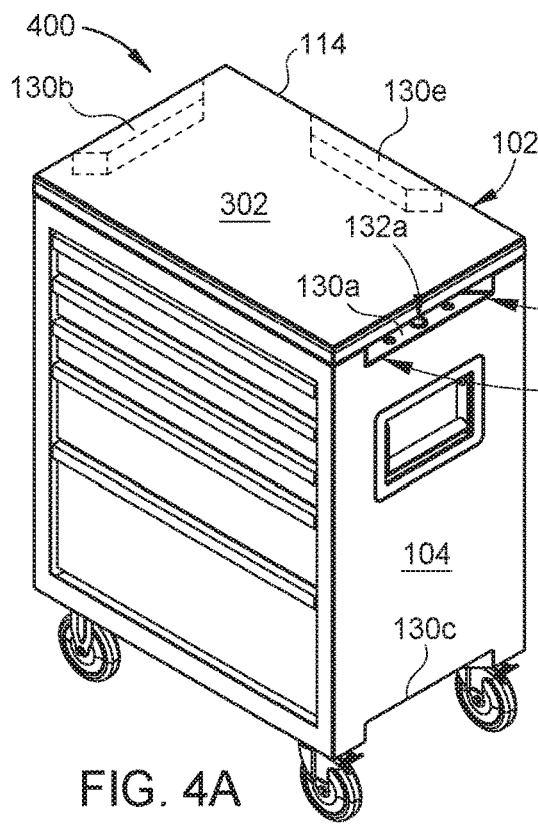
FIG. 4A
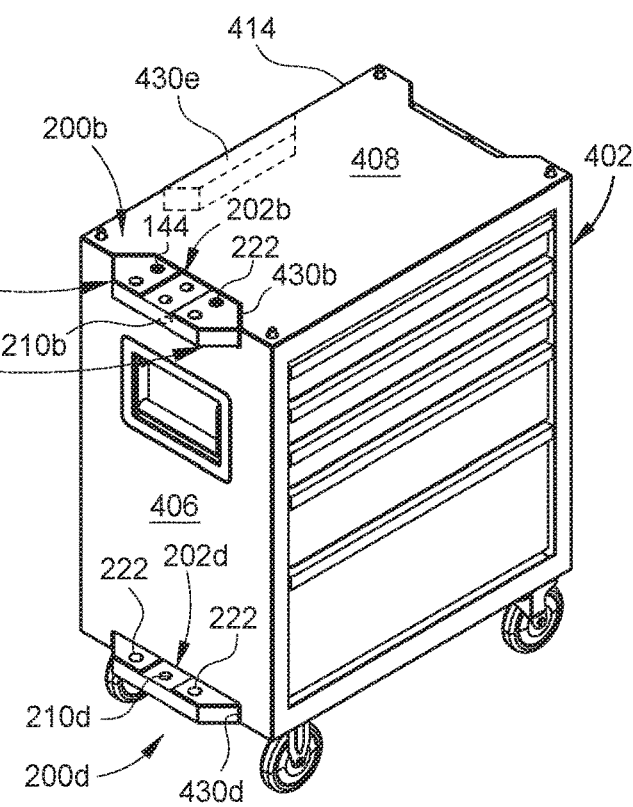

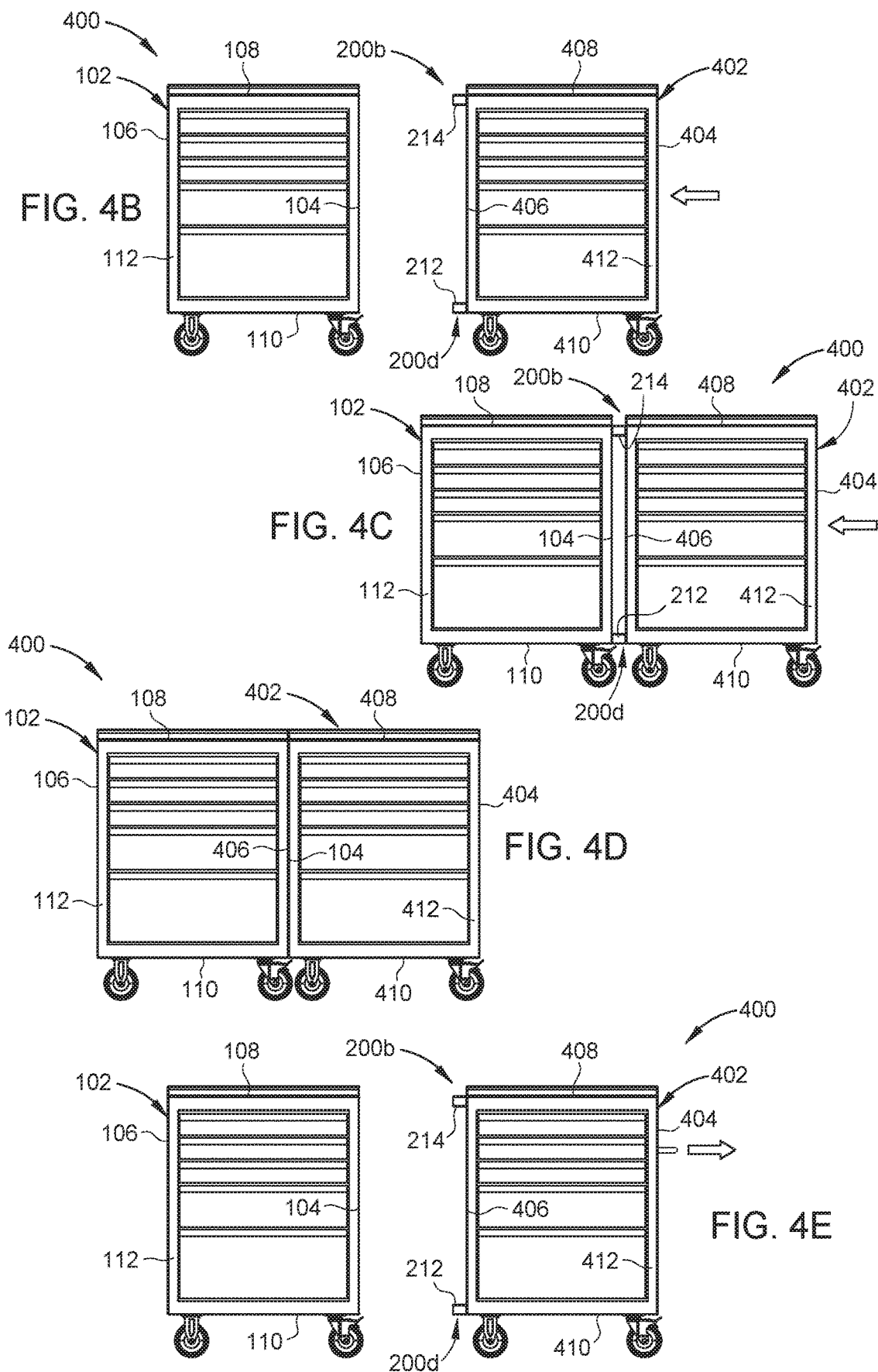

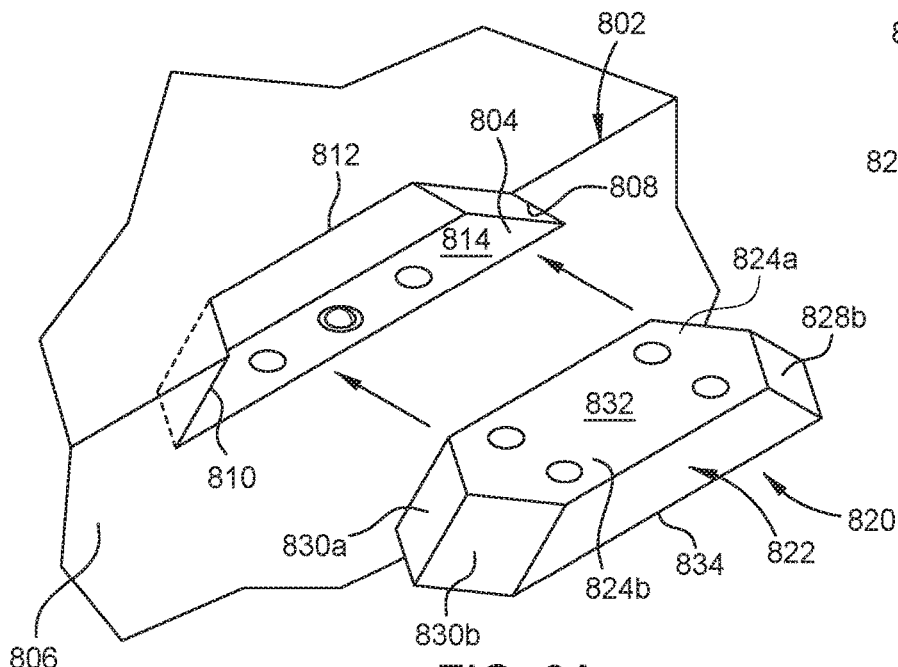
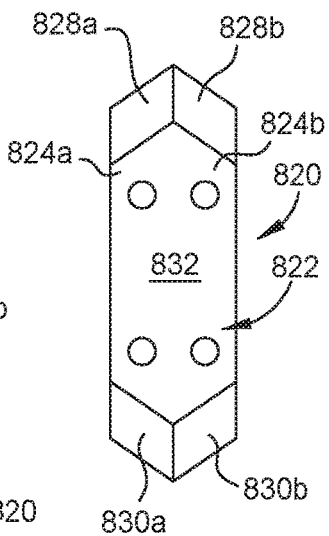
FIG. 8A
FIG. 8C
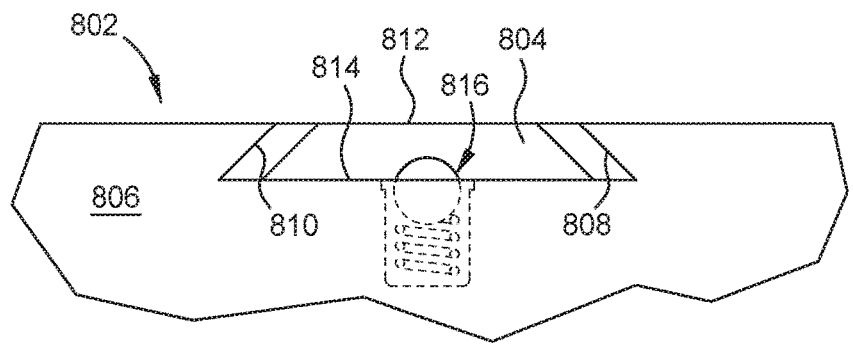
FIG. 8B
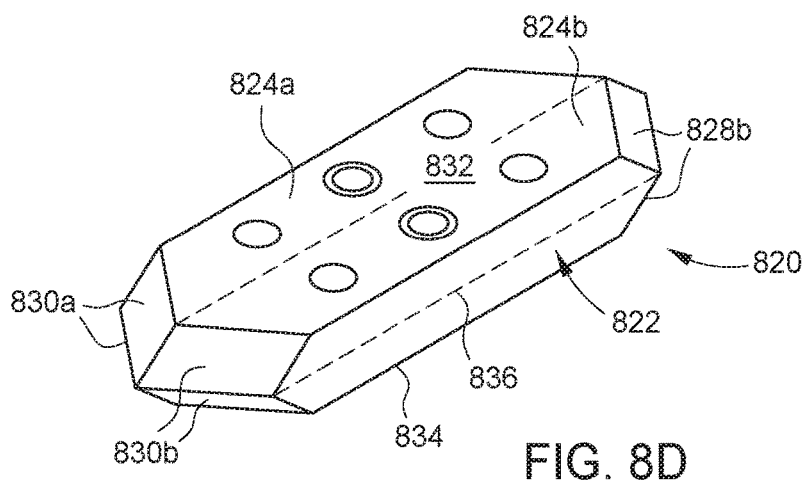
FIG. 8D

MODULAR STORAGE SYSTEM

BACKGROUND

Embodiments described herein generally relate to storage and organization, more particularly, embodiments relate to modular storage units that connect and disconnect without the use of tools or external hardware.

Some storage systems have units that bolt together with external hardware. These systems require the use of tools to connect and disconnect the units, thereby making installation and reconfiguration equipment and labor intensive. Some other systems have units that are positioned adjacent to each other without connecting the units together. The units remain movable relative to each other even when the system is fully installed. Undesirable movement of the units can occur due to the lack of an integrated system. Embodiments of the present disclosure overcome at least some of these issues.

SUMMARY

Embodiments of the present disclosure generally relate to storage and organization, more particularly, embodiments relate to modular storage units that connect and disconnect without the use of tools or external hardware.

Embodiments of the present disclosure relate to a modular storage system, comprising: first and second unit bodies configured to be connected together; and a tongue piece having first and second sides, each of the first and second sides having a shape corresponding to a groove formed in each of the first and second unit bodies, wherein the first side is secured in the groove of the first unit body, and wherein the second side is configured to be removably disposed in the groove of the second unit body for connecting the first and second unit bodies together.

Embodiments of the present disclosure relate to a connection arrangement for two items, comprising: a groove formed in a surface of each item, each groove including at least one outwardly biased member constructed and arranged to retain a distal end of a tongue when the distal end is inserted into the groove, wherein a proximal end of the tongue is mountable in either groove, and wherein the distal end of the tongue is receivable in either groove.

Embodiments of the present disclosure relate to a modular storage system, comprising: a unit body having a first lateral end, a second lateral end opposite the first lateral end, and an upper surface extending between the first and second lateral ends, the unit body including: a first groove formed in the upper surface at the first lateral end, and a first groove connector in the first groove; and a tongue piece having a first side having: a shape corresponding to the first groove, and a tongue connector configured to releasably engage the first groove connector.

Embodiments of the present disclosure include a method of using a modular storage system, the method comprising: moving a first lateral end of a first unit body relative to a second opposing lateral end of a second unit body; engaging a tongue piece extending from the second lateral end with a groove formed in the first lateral end; and applying a pushing force above a threshold value for releasably engaging a groove connector of the groove with a tongue connector of the tongue piece to connect the first and second unit bodies.

Embodiments of the present disclosure relate to a tongue piece for a modular storage unit, the tongue piece comprising: a tongue piece body having a first and second side, each of the first and second sides having: a shape corresponding to a groove formed in a unit body of the modular storage unit; a plurality of apertures formed through the tongue piece body and extending between first and second opposite faces thereof; and a tongue connector configured to releasably engage a groove connector of the unit body.

Embodiments of the present disclosure relate to a tongue piece for a modular storage unit, the tongue piece comprising: a tongue piece body having a first face, a second face opposite the first face, and first and second lateral edges extending between the first and second faces, the tongue piece body including: a plurality of depressions formed in each of the first and second faces; and a plurality of apertures formed through the tongue piece body and extending between the first and second faces.

Embodiments of the present disclosure relate to a modular storage system, comprising: a first unit body having a first lateral end, a second lateral end opposite the first lateral end, and an upper surface extending between the first and second lateral ends, the unit body including: a first groove formed in the upper surface at the first lateral end, and a first groove connector in the first groove; and a second unit body configured to be connected to the first unit body, the second unit body having a tongue piece extending from a lateral end thereof, the tongue piece having a first and second side, each of the first and second sides having: a shape corresponding to the first groove, and a tongue connector configured to releasably engage the first groove connector.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 1E-1F are enlarged isometric views of portions of FIG. 1A.

FIG. 1G is an enlarged isometric view of another portion of FIG. 1A.

FIG. 1H is a side sectional view of an exemplary groove connector which may be used in the unit of FIG. 1A.

FIG. 3A is a top isometric view of a front side of an exemplary modular storage system, according to one or more embodiments.

FIG. 3B is a top isometric view of a front side of an exemplary modular storage system, according to one or more other embodiments.

FIG. 4A is a top isometric view of a front side of an exemplary modular storage system, according to one or more other embodiments.

FIGS. 4B-4E are front elevation views of the exemplary modular storage system of FIG. 4A at different stages of use.

FIG. 8A is a top isometric view of another exemplary unit body and tongue piece, according to one or more embodiments.

FIG. 8B is a right side view of the unit body of FIG. 8A.

FIG. 8C is a top view of the tongue piece of FIG. 8A.

FIG. 8D is a top isometric view of another exemplary tongue piece, according to one or more embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein generally relate to storage and organization, more particularly, embodiments relate to modular storage units that connect and disconnect without the use of tools or external hardware. Modular storage systems of the present disclosure may be used for a wide variety of purposes including, e.g., garage storage and tool storage.

Figure 1A:
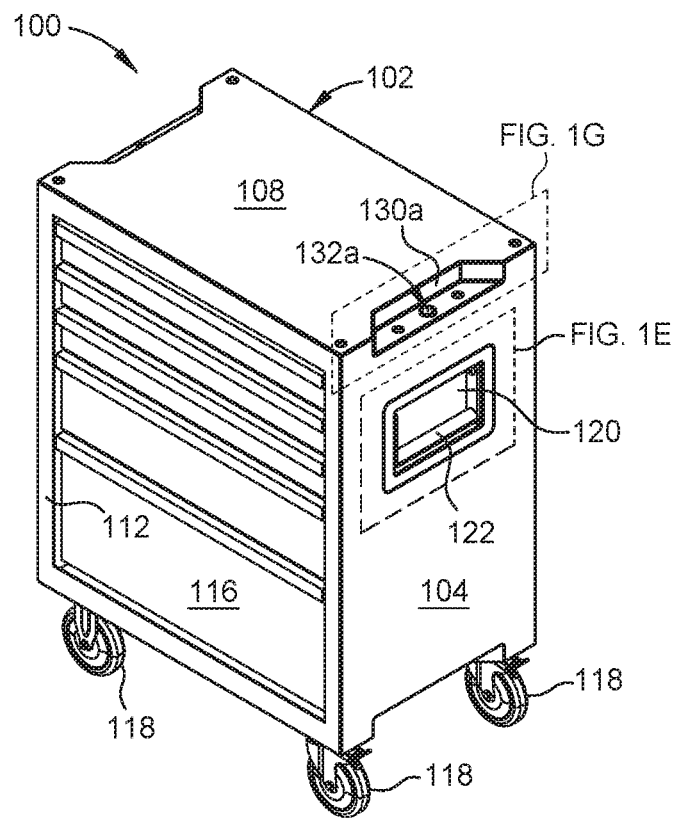
FIG. 1A is a top isometric view of a front side of an exemplary modular storage unit, according to one or more embodiments.
Figure 1B:
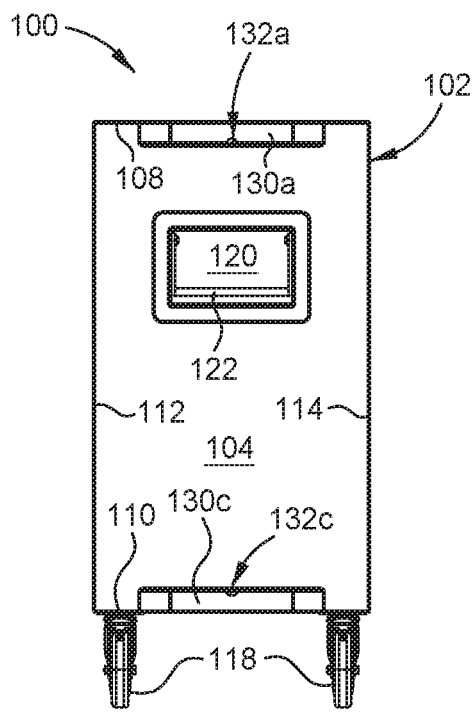
FIGS. 1B-1D are right side, top, and bottom elevation views, respectively, of the unit of FIG. 1A.
Figure 1C:
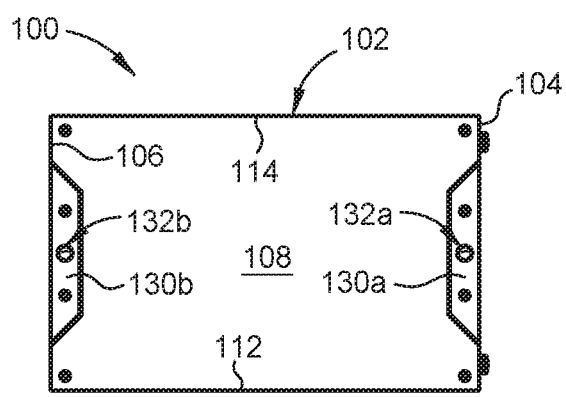
Figure 1D:
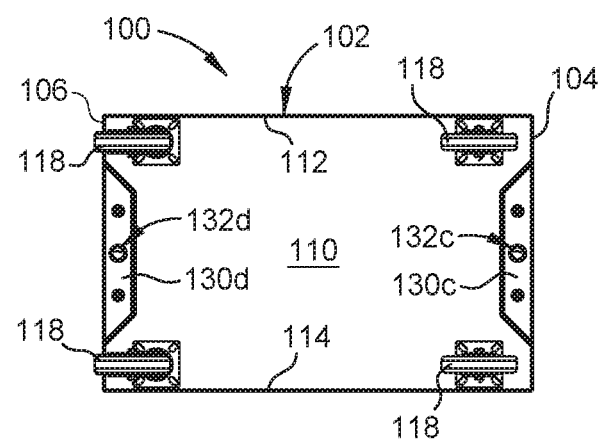

FIG. 1A is a top isometric view of a front side of an exemplary modular storage unit 100. FIGS. 1B-1D are right side, top, and bottom elevation views, respectively, of the unit 100 of FIG. 1A. The unit 100 includes a unit body 102 having a first lateral end 104, a second lateral end 106 opposite the first lateral end 104, and an upper surface 108 extending between the first and second lateral ends 104, 106. The unit body 102 has a lower surface 110 opposite the upper surface 108, the lower surface 110 extending between the first and second lateral ends 104, 106. In one or more embodiments, the first and second lateral ends are 104, 106 are vertically aligned in the direction of gravity and the upper and lower surfaces 108, 110 are horizontally aligned orthogonal to the first and second lateral ends 104, 106. The unit body 102 has a front side 112 and a back side 114 opposite the front side 112. In this example, the front side 112 includes a plurality of drawers 116 disposed therein. However, the unit 100 is not particularly limited to the illustrated embodiment. In some other embodiments, the front side 112 includes one or more doors, shelves, or removable containers in addition to or in the alternative to the plurality of drawers 116.

The unit body 102 includes a plurality of casters 118 coupled to the lower surface 110. The plurality of casters 118 are configured to support the unit body 102 and to enable linear and pivoting movement thereof. In some embodiments, the plurality of casters 118 are pivotable about an axis in the direction of gravity. In some embodiments, the plurality of casters 118 are continuously disposed within a lateral footprint between the first and second lateral ends 104, 106 of the unit body 102. Beneficially, maintaining the plurality of casters 118 inside the footprint of the unit body 102 can prevent interference with an adjoining unit body. In this example, a first pair of casters 118 proximate the first lateral end 104 are pivotable, and a second pair of casters 118 proximate the second lateral end 106 are fixed. The first pair of casters 118 are lockable to prevent both linear and pivoting movement of the unit body 102. However, the plurality of casters 118 are not particularly limited to the illustrated embodiment. In some other embodiments, each of the plurality of casters 118 is pivotable, lockable, or both. In some embodiments, the first and second pairs of casters 118 are switched.

FIGS. 1E-1F are enlarged isometric views of a portion of FIG. 1A showing a handle of the unit 100 in a folded position and an extended position, respectively. Each of the first and second lateral ends 104, 106 of the unit body 102 has a recess 120 formed therein. Each of the first and second lateral ends 104, 106 has a handle 122 disposed in a corresponding one of the recesses 120. Each handle 122 is rotatably coupled to the unit body 102 within the corresponding recess 120. Each handle 122 is movable between a folded position where the handle 122 is disposed entirely within the corresponding recess 120 and an extended position where the handle 122 extends outside the corresponding recess 120 and away from a corresponding one of the first or second lateral ends 104, 106. In other words, the handles 122 can be extended from a flush mounted position for allowing adjoining unit bodies to be disposed side-by-side to the extended position for providing a grip point for pushing or pulling the unit body 102.

FIG. 1G is an enlarged isometric view of a portion of FIG. 1A illustrating an exemplary tongue piece 200 therewith. The unit body 102 includes a first upper groove 130a formed in the upper surface 108 at the first lateral end 104. A groove connector 132a is disposed in the groove 130a. The groove connector 132a has a contact surface 134 extending in the direction of the upper surface 108. FIG. 1H is a side sectional view of an exemplary groove connector 132 which may be used in the unit 100 of FIG. 1A. In this example, the groove connector 132 is a ball plunger comprising a housing 136, an axially movable ball 138 disposed in the housing 136, and a spring 140 disposed between the housing 136 and the ball 138. The spring 140 is configured to apply a biasing force to the ball 138 in the direction of the upper or lower surface 108, 110 and the tongue piece 200 to releasably engage the contact surface 134 of the ball plunger with a tongue connector of the tongue piece 200 to be described in more detail below.

In some embodiments, the housing 136 is threaded into the unit body 102. In some embodiments, an installation height of the housing 136 relative to baseline (FIG. 1G) affects the actuation force of the groove connector 132 by requiring more or less compression of the spring 140 in order to engage the tongue connector. For example, when the housing 136 is installed below baseline, less of the contact surface 134 is exposed in the groove 130a resulting in a reduced actuation force. Alternatively, when the housing 136 is installed above baseline, more of the contact surface 134 is exposed in the groove 130a resulting in an increased actuation force. In some embodiments, the actuation force is adjustable based on the design of the groove connector 132. For example, using a spring 140 having a higher spring constant increases the actuation force, and a spring 140 having a lower spring contact decreases the actuation force.

For springs 140 having the same spring constant, using a ball 138 having a larger outside diameter increases the actuation force, and using a ball 138 having a smaller outside diameter decreases the actuation force.

The unit body 102 includes a second upper groove 130b formed in the upper surface 108 at the second lateral end 106. A groove connector 132b is disposed in the groove 130b. The groove connector 132b has a contact surface 134 extending in the direction of the upper surface 108. The unit body 102 includes a first lower groove 130c formed in the lower surface 110 at the first lateral end 104. A groove connector 132c is disposed in the groove 130c. The groove connector 132c has a contact surface 134 extending in the direction of the lower surface 110. The unit body 102 includes a second lower groove 130d formed in the lower surface 110 at the second lateral end 106. A groove connector 132d is disposed in the groove 130d. The groove connector 132d has a contact surface 134 extending in the direction of the lower surface 110.

A plurality of openings 142 are formed in each of the grooves 130a-d. In some embodiments, each of the plurality of openings 142 is configured to receive a corresponding fastener 144 for securing a tongue piece 200 to the unit body 102. In this example, the fasteners 144 are socket cap screws. In some other embodiments, the fasteners 144 can be any suitable type of threaded fastener, bolt, or machine screw having a conventional or specialty head. In some other embodiments, the tongue piece 200 is formed integrally with the unit body 102. For example, the tongue piece 200 may be molded, welded, or otherwise formed into the unit body 102 instead of being inserted into one of the grooves 130a-d. In some other embodiments, the tongue piece 200 is secured to the unit body 102 with one or more fasteners without being inserted into one of the grooves 130a-d. For example, the tongue piece 200 may be bolted or otherwise attached to one of the first or second lateral ends 104, 106 or the back side 114 of the unit body 102.

Figure 2A:
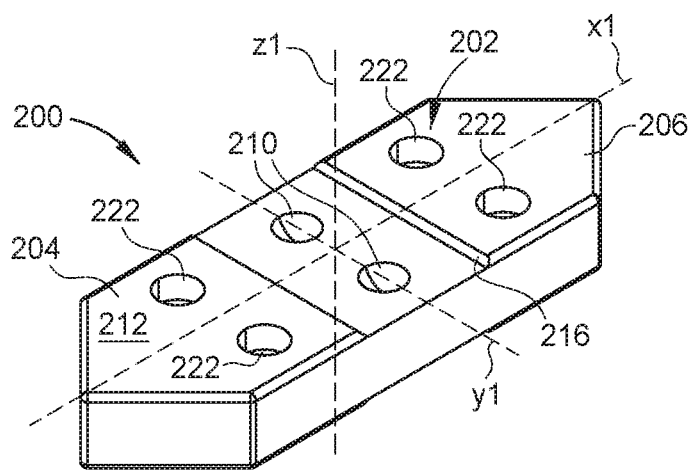
FIG. 2A is a top isometric view of an exemplary tongue piece which may be used with the unit of FIG. 1A.
Figure 2B:
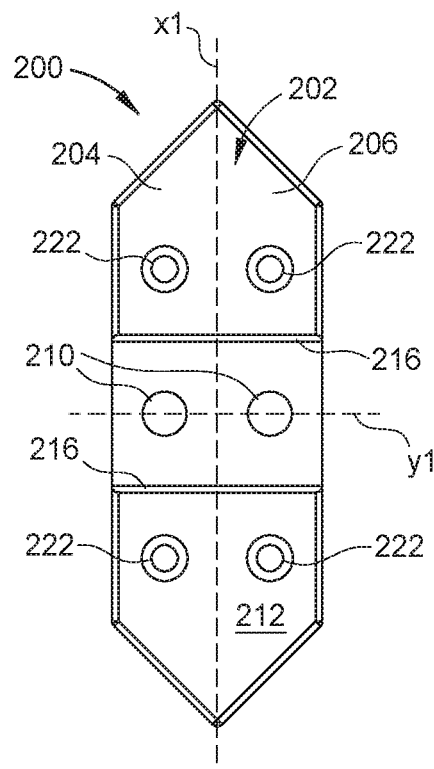
FIGS. 2B-2C are top and side elevation views, respectively, of the tongue piece of FIG. 2A.
Figure 2C:
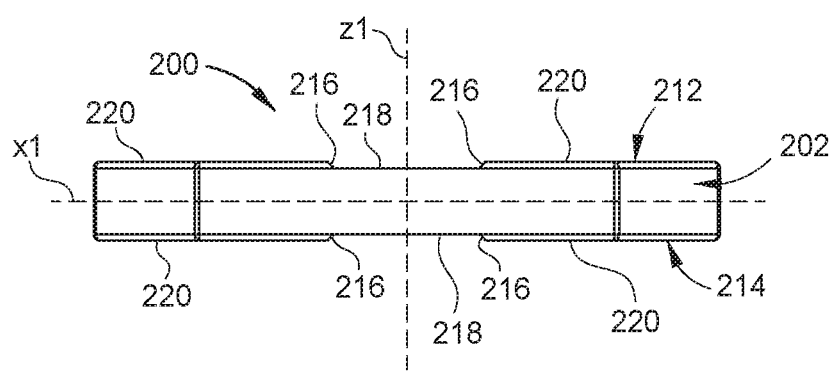

FIG. 2A is a top isometric view of an exemplary tongue piece 200 which may be used with the unit 100 of FIG. 1A. FIGS. 2B-2C are top and side elevation views, respectively, of the tongue piece 200 of FIG. 2A. A tongue body 202 of the tongue piece 200 has a first side 204 and a second side 206. The first and second sides 204, 206 are symmetrical about a longitudinal axis x1. In some embodiments, the tongue body 202 is symmetrical about each of the three orthogonal axes x1, y1, z1. Each of the first and second sides 204, 206 has a shape corresponding to the grooves 130a-d. Each of the first and second sides 204, 206 has a tongue connector 210 configured to releasably engage a corresponding one of the groove connectors 132a-d. In this example, the tongue connector 210 is a rounded depression, or recess, formed in a top face 212 of the tongue body 202. However, the shape of the tongue connector 210 is not particularly limited to the illustrated embodiments. For example, the tongue connector 210 can have a different shape which is conformal to a contact surface 134 of a corresponding one of the groove connectors 132a-d. In this example, the tongue connector 210 is disposed at a longitudinal center of the tongue body 202, i.e., a center point of the tongue body 202 along the axis x1. In some other embodiments, the tongue connector 210 is located off-center of the tongue body 202.

The tongue body 202 has a bottom face 214 opposite the top face 212. The top and bottom faces 212, 214 of the tongue body 202 are symmetrical to each other. Each of the top and bottom faces 212, 214 includes a step 216 between a medial portion 218 and first and second end portions 220 thereof (FIG. 2C). The medial portion 218 is recessed relative to the first and second end portions 220, and the plurality of tongue connectors 210 are formed in the medial portion 218. In some other embodiments, each of the top and bottom faces 212, 214 is flat such that the medial portion 218 and the first and second end portions 220 have the same thickness. In some embodiments, a shape of the first and second end portions 220 is tapered relative to the medial portion 218 in order to self-align the tongue body 202 with a corresponding groove 130a-d. In this example, each of the first and second end portions 220 has a V-shape such that the tongue body 202 has a hexagonal shape. In some other embodiments, each of the first and second end portions 220 is rounded such that the tongue body 202 has an oval or obround shape.

Each of the first and second sides 204, 206 has a plurality of apertures 222 formed through the tongue body 202. Each of the plurality of apertures 222 extends between the top and bottom faces 212, 214 along an axis orthogonal to the longitudinal axis x1. In this example, the plurality of apertures 222 includes two apertures positioned on opposite sides of the tongue connector 210 and longitudinally aligned therewith. In some other embodiments, the plurality of apertures 222 includes more than two apertures. In this example, the plurality of apertures 222 are formed through each of the first and second end portions 220 of the tongue body 202. In embodiments where the top and bottom faces 212, 214 are flat, a boss can be machined around each aperture 222 to increase a local thickness of the tongue body 202 above the thickness of the medial portion 218. Each of the plurality of apertures 222 is configured to receive a corresponding fastener for securing the tongue piece 200 to the unit body 102. In this example, each of the plurality of apertures 222 is counter bored from each of the top and bottom faces 212, 214 such that an inside diameter of each aperture 222 includes a narrow region. In some other embodiments, each of the plurality of apertures 222 has a constant inside diameter.

FIG. 3A is a top isometric view of a front side of an exemplary modular storage system 300 illustrating installation of a work surface 302. In FIG. 3A, the work surface 302 is shown in phantom in order to illustrate the upper surface 108 of the unit body 102 disposed thereunder. In some embodiments, the work surface 302 is formed from wood, e.g., maple, metal, e.g., stainless steel or galvanized steel, rubber, or combinations thereof. In some embodiments, the work surface 302 is a single piece, e.g., a block of wood or metal. In one or more embodiments, the work surface 302 includes two or more pieces, e.g., a tray with an outer lip having a non-slip rubber mat removably positioned on the tray inside the outer lip.

The work surface 302 is configured to be removably placed on the upper surface 108 of the unit body 102. The upper surface 108 of the unit body 102 has a plurality of holes 124 formed therein. In this example, the upper surface 108 includes four holes located at each corner of the upper surface 108. In some other embodiments, the upper surface 108 can include one or more additional holes at other positions on the upper surface 108. Each of the plurality of holes 124 receives a corresponding pin 304 disposed therein. In some embodiments, the plurality of pins 304 are removable. In some other embodiments without the plurality of holes 124 in the upper surface 108, the plurality of pins 304 are attached directly to the upper surface 108. The plurality of pins 304 extend from the upper surface 108 toward the work surface 302. The work surface 302 includes a plurality of openings 306 disposed in a unit body facing surface thereof. The plurality of openings 306 are in registration with corresponding ones of the pins 304 for aligning the work surface 302 with the upper surface 108. In some embodiments, the work surface 302 is held against the upper surface 108 due to the force of gravity. In some other embodiments, the plurality of pins 304 form a friction fit within the corresponding ones of the openings 306 in order to secure the work surface 302 to the upper surface 108.

FIG. 3B is a top isometric view of a front side of an exemplary modular storage system 300 having an upper unit body 310 installed on the upper surface 108 of the unit body 102 in place of the work surface 302. In such embodiments, the attachment of the upper unit body 310 is the same as the work surface 302. In some other embodiments, the upper unit body 310 is positioned inside a tray having an outer lip (not shown). In some embodiments, the tray and outer lip are formed from metal. In such embodiments, the plurality of pins 304 interface with corresponding ones of the openings 306 in a unit body facing surface of the tray.

FIG. 4A is a top isometric view of a front side of an exemplary modular storage system 400 illustrating an adjoining unit body 402 therewith. The adjoining unit body 402 has a tongue piece 200b installed in the second upper groove 430b formed in the upper surface 408 at the second lateral end 406. The work surface 302 is omitted from the adjoining unit body 402 to more clearly illustrate the tongue piece 200b. The tongue piece 200b is secured to the adjoining unit body 402 using a pair of fasteners 144 disposed through corresponding ones of the plurality of apertures 222 of the tongue body 202b. The adjoining unit body 402 has another tongue piece 200d installed in the second lower groove 430d formed in the lower surface 410 at the second lateral end 406. The tongue piece 200d is secured to the unit body 402 in the same way as the tongue piece 200b. Thus, in this example, the adjoining unit body 402 has both upper and lower tongue pieces 200b, 200d. In some other embodiments, the adjoining unit body 402 has only one tongue piece, such as either an upper tongue piece 200b or a lower tongue piece 200d but not both. In some embodiments where the adjoining unit body 402 has only an upper tongue piece 200b, the unit body 102 may have a lower tongue piece in the groove 130c. In some embodiments where the adjoining unit body 402 has only a lower tongue piece 200d, the unit body 102 may have an upper tongue piece in the groove 130a (FIG. 1G). Alternatively, in some embodiments where the adjoining unit body 402 has only one tongue piece, the unit body 102 may not have a tongue piece, such that the unit bodies 102, 402 are connected by only a single tongue piece between them.

In some embodiments, a third upper groove 130e, a third lower groove (not shown), or both, are formed in the back side 114 of the unit body 102. In some embodiments, a third upper groove 430e, a third lower groove (not shown), or both, are formed in a back side 414 of the unit body 402. In some embodiments, the unit bodies 102, 402 are connected back to back, i.e., a tongue piece is coupled between the groove 130e in the back side 114 of the unit body 102 and the groove 430e in the back side 414 of the unit body 402. In some other embodiments, the unit bodies 102, 402 are connected in a T shape, e.g., where the tongue piece 200b in the groove 430b of the unit body 402 is connected in the groove 130e in the back side 114 of the unit body 102.

Figure 5:
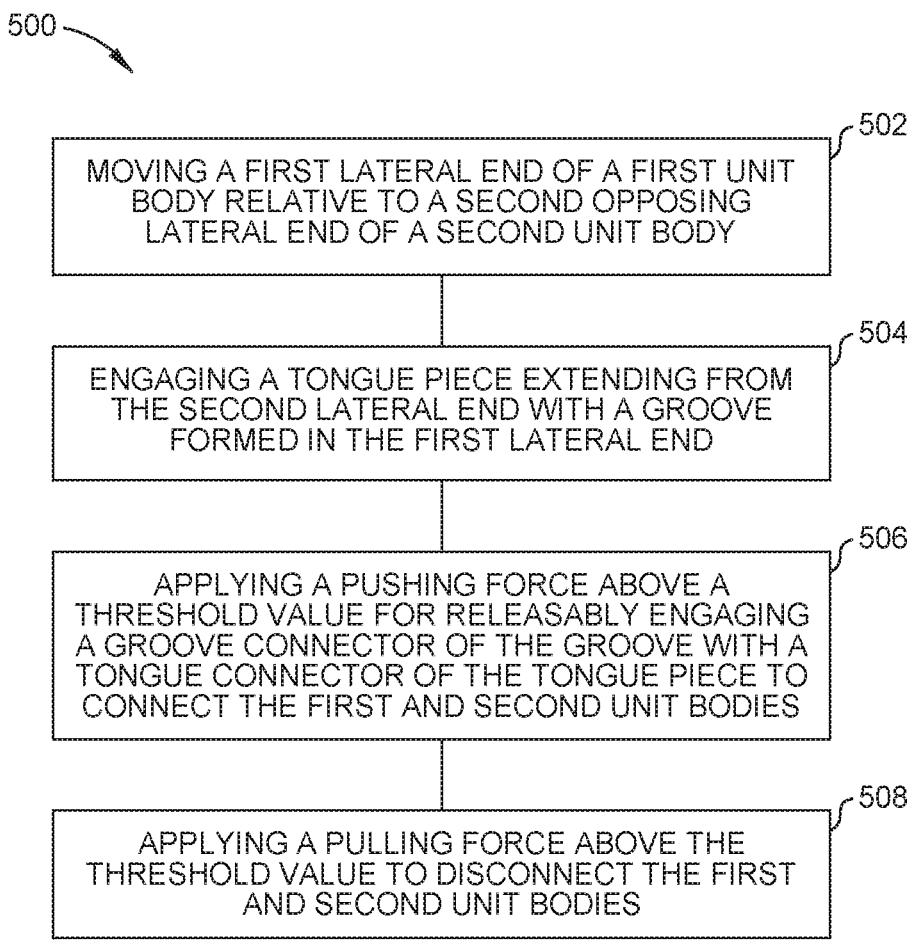
FIG. 5 is a diagram illustrating a method of using the system of FIG. 4A according to the stages illustrated in FIGS. 4B-4E.

FIGS. 4B-4E are front elevation views of the exemplary modular storage system 400 of FIG. 4A at different stages of use according to a method 500 illustrated in the diagram of FIG. 5. At operation 502, a first lateral end of a first unit body is moved relative to a second opposing lateral end of a second unit body. In this example, the first lateral end 104 of the unit body 102 is moved relative to the second lateral end 406 of the adjoining unit body 402. As used herein, relative movement can include moving the unit body 102 while the adjoining unit body 402 is stationary, moving the adjoining unit body 402 while the unit body 102 is stationary, or moving both the unit body 102 and the unit body 402 concurrently. In this example, the adjoining unit body 402 is being moved toward the stationary unit body 102 by applying a pushing force to the first lateral end 404 of the adjoining unit body 402 as indicated by the arrow.

At operation 504, a tongue piece extending from the second lateral end is engaged with a groove formed in the first lateral end. In this example, the tongue piece 200b extending from the second lateral end 406 of the adjoining unit body 402 engages the groove 130a formed in the upper surface 108 at the first lateral end 104 of the unit body 102. Likewise, the tongue piece 200d engages the groove 130c in the same way. Engaging the tongue piece 200b with the groove 130a includes partially sliding the tongue piece 200b into the groove 130a without connecting the unit bodies 102, 402. During the sliding, the corresponding shapes of the tongue piece 200b and the groove 130a self-aligns the first and second unit bodies 102, 402. Engaging and sliding the tongue piece 200d in the groove 130c occurs in the same way. According to the method 500, each of the tongue pieces 200b, 200d is attached to the adjoining unit body 402 using a plurality of fasteners 144 before engaging the tongue pieces 200b, 200d with ones of the corresponding grooves 130a, 130c.

At operation 506, a pushing force is applied above a threshold value for releasably engaging a groove connector of the groove with a tongue connector of the tongue piece to connect the first and second unit bodies. In this example, the pushing force is applied to the first lateral end 404 of the adjoining unit body 402. In some embodiments, the threshold value is measured as the total force applied in a direction orthogonal to the direction of gravity and/or orthogonal to a direction of movement of the ball 138. In some embodiments, the threshold value is about 2.5 lb or more, such as from about 2.5 lb to about 10 lb, such as from about 2.5 lb to about 7.5 lb, such as about 5 lb. The threshold value corresponds to an actuation force required to depress the contact surfaces 134 of the groove connectors 132a, 132c (FIGS. 1C-1D) below the bottom face 214 of the tongue body 202b and above the top face 212 of the tongue body 202d, respectively. Providing the actuation force allows the tongue bodies 202b, 202d to slide fully into the corresponding grooves 130a, 130c formed in the unit body 102 such that groove connectors 132a, 132c releasably engage corresponding ones of the tongue connectors 210b, 210d.

At operation 508, a pulling force is applied above the threshold value to disconnect the first and second unit bodies. In this example, the pulling force is applied to the handle 122 coupled to the first lateral end 404 of the adjoining unit body 402. Providing the actuation force disengages the groove connectors 132a, 132c from corresponding ones of the tongue connectors 210b, 210d thereby allowing the tongue bodies 202b, 202d to slide out of the corresponding grooves 130a, 130c formed in the unit body 102.

Figure 6A:
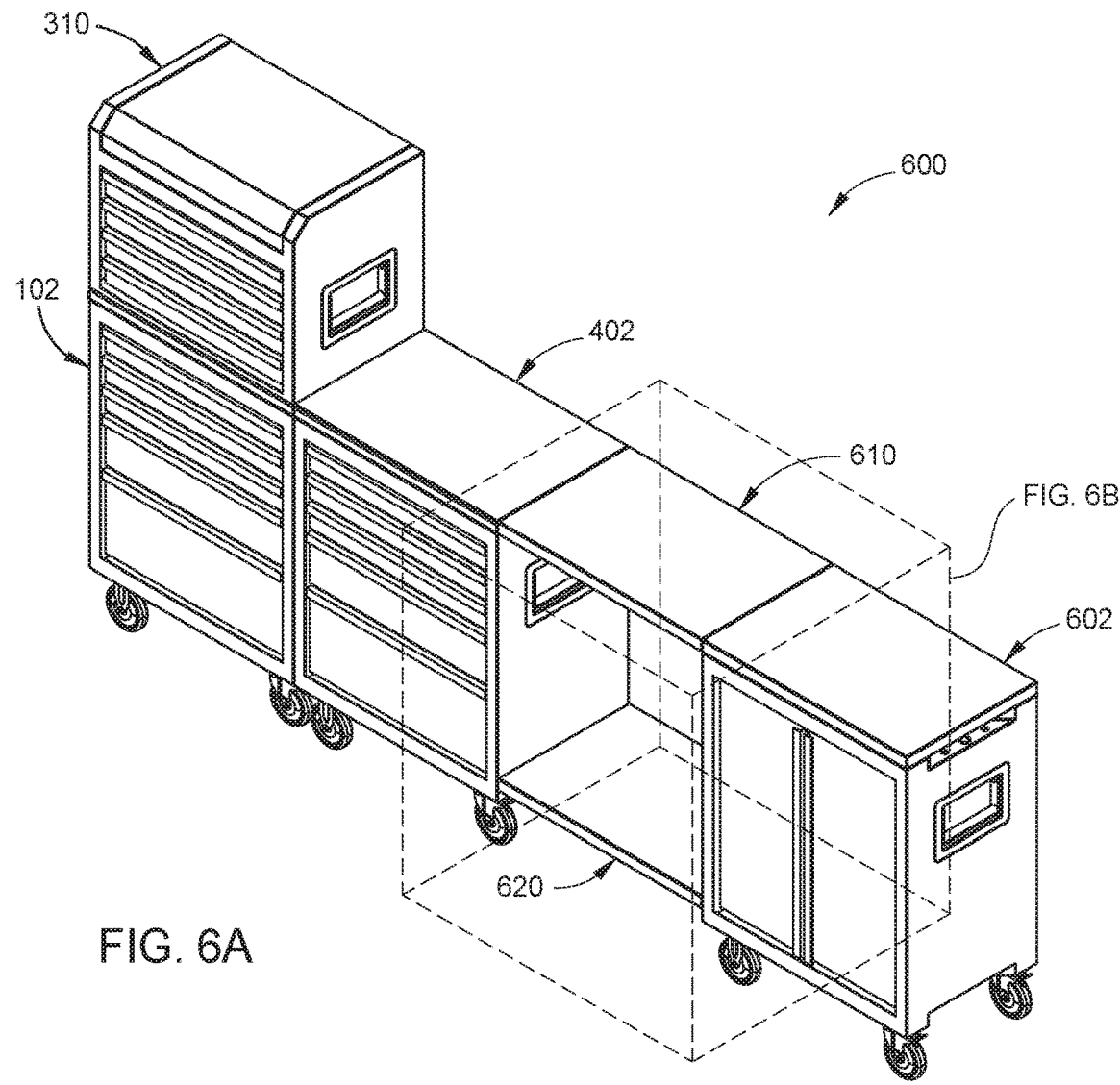
FIG. 6A is a top isometric view of a front side of an exemplary modular storage system, according to one or more other embodiments.

FIG. 6A is top isometric view of a front side of an exemplary modular storage system 600 illustrating a bridging work space. The system 600 includes the unit body 102, the upper unit body 310 on the unit body 102, the adjoining unit body 402 beside the unit body 102, another unit body 602 spaced from the unit body 402, an upper bridging work space 610, and a lower bridging work space 620. The upper and lower bridging work spaces 610, 620 extend between the unit bodies 402, 602.

Figure 6B:
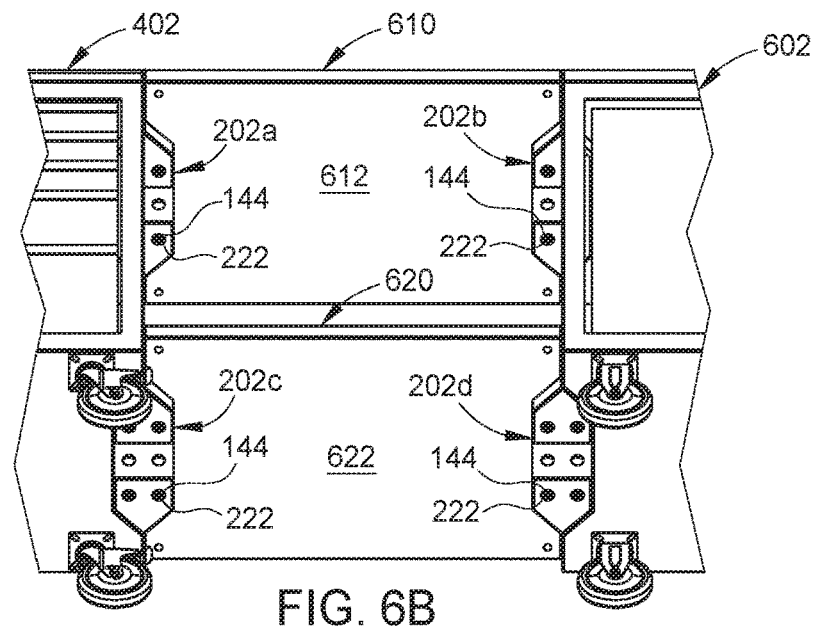
FIG. 6B is an enlarged bottom isometric view of a front side of the system of FIG. 6A.

FIG. 6B is an enlarged bottom isometric view of a front side of the system 600 of FIG. 6A illustrating attachment of the upper and lower bridging work spaces 610, 620. A plurality of adapters (not shown) are disposed on a bottom surface 612 of the upper bridging work space 610. In embodiments where the work space 610 is formed from wood, the adapters can be threaded inserts having a threaded inside diameter for receiving a fastener 144 disposed through the one of the plurality of apertures 222 formed through the tongue body 202. In embodiments where the work space 610 is formed from stainless steel, the adapters can be nuts welded to the bottom surface 612 and receiving a fastener 144 in the same way as the threaded inserts.

The upper bridging work space 610 is installed by placing the bottom surface 612 against a top face 212 of each of the tongue bodies 202a, 202b such that the adapters on the bottom surface 612 are aligned with the plurality of apertures 222. Then, the work space 610 is attached using the fasteners 144. A bottom surface 622 of the lower bridging work space 620 has a plurality of adapters which are secured to the tongue bodies 202c, 202d in the same way as the work space 610. In this example, the bridging work spaces 610, 620 are installed without using the tongue connectors 210. However, in some other embodiments, the work spaces 610, 620 can include one or more connectors similar to the groove connectors 132a-d for releasably engaging one of the tongue connectors 210 of each of the tongue pieces 200a-d.

Figure 7A:
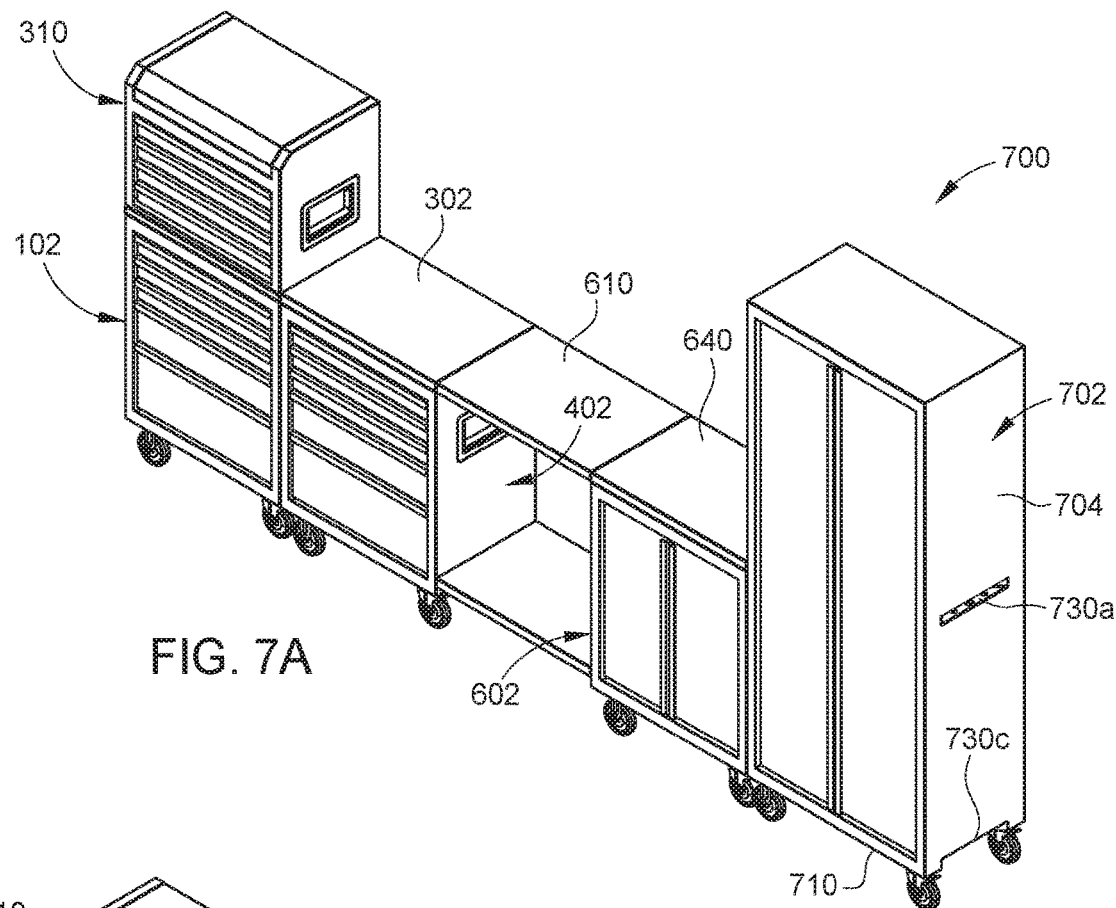
FIG. 7A is a top isometric view of a front side of an exemplary modular storage system, according to one or more embodiments.
Figure 7B:
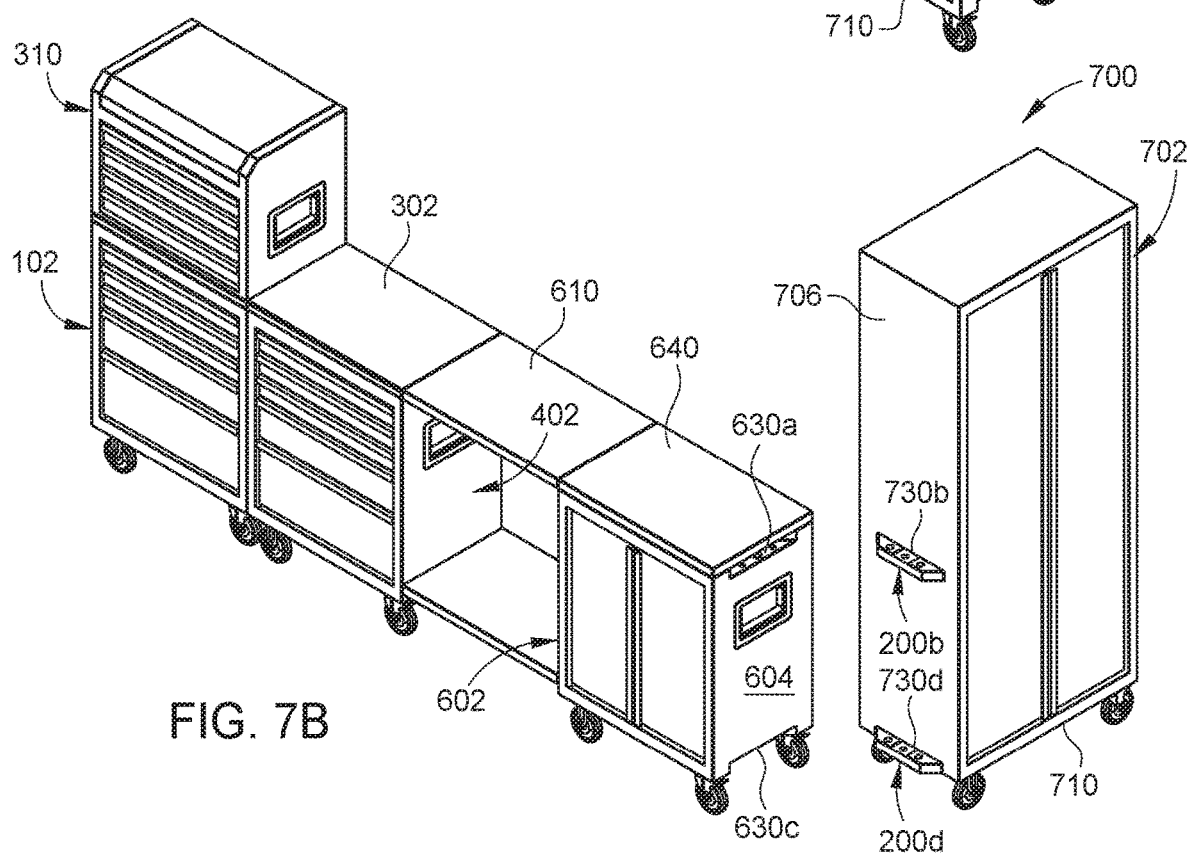
FIG. 7B is a top isometric view of the front side of the exemplary modular storage system of FIG. 7A illustrating one of the units disconnected.
Figure 7C:
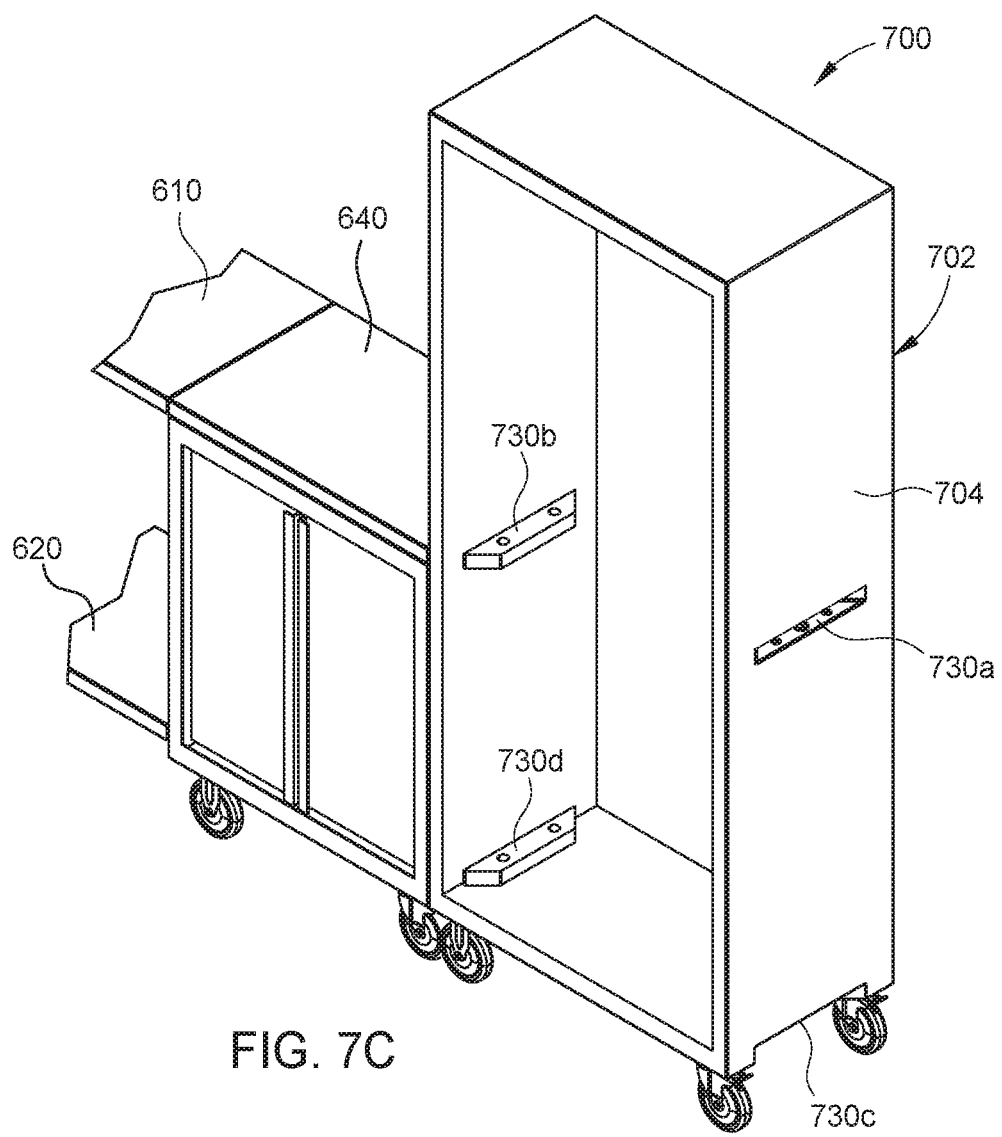
FIG. 7C is a top isometric view of a portion of FIG. 7A illustrating an internal structure of one of the units.

FIG. 7A is a top isometric view of a front side of an exemplary modular storage system 700, according to one or more embodiments. The system 700 is similar to the system 600 and additionally includes a unit body 702 coupled to the unit body 602. In this example, the unit body 702 is a tall cabinet. The unit body 702 is taller than each of the unit bodies 102, 310, 402, and 602. FIG. 7B is a top isometric view of the front side of the exemplary modular storage system 700 of FIG. 7A illustrating the unit body 702 disconnected. FIG. 7C is a top isometric view of a portion of FIG. 7A illustrating an internal structure of the unit body 702. In FIG. 7C, the doors are omitted to show the internal structure. The unit body 702 has a first upper groove 730a formed in a first lateral end 704, a second upper groove 730b formed in a second lateral end 706, a first lower groove 730c formed in a lower surface 710 at the first lateral end 704, and a second lower groove 730d formed in the lower surface 710 at the second lateral end 706. Each of the grooves 730a-d is stamped and welded into the unit body 702. Each of the grooves 730a-d includes a groove connector and a plurality of fastener openings as described with respect to FIG. 1G. In this example, a tongue piece 200b, 200d is secured in each of the grooves 730b, 730d using one or more fasteners as described above. Each of the tongue pieces 200b, 200d is configured to engage a corresponding groove 630a, 630c formed in a first lateral end 604 of the unit body 602. Beneficially, a work surface can be mounted directly to the side of the tall cabinet. For example, the work surface 640 disposed on the unit body 602 is configured to be mounted directly to the second lateral end 706 when the unit bodies 602, 702 are connected together. In some embodiments, each of the first and second lateral ends 704, 706 of the unit body 702 includes a handle disposed in a corresponding recess as described above with respect to the unit body 102.

FIG. 8A is a top isometric view of an exemplary unit body 802 configured to receive a tongue piece 820, according to one or more embodiments. FIG. 8B is a right side view of the unit body 802 of FIG. 8A. FIG. 8C is a top view of the tongue piece 820 of FIG. 8A. The unit body 802 is similar to the unit body 102 of FIG. 1A and corresponding description thereof may be incorporated herein without limitation. Likewise, the tongue piece 820 is similar to the tongue piece 200 of FIGS. 2A-2C and corresponding description thereof may be incorporated herein without limitation. The unit body 802 has a groove 804 formed in a lateral end 806. In some embodiments, the groove 804 has a dovetail shape configured to match the shape of a corresponding tongue piece 820. The groove 804 has first and second opposite edges 808, 810 intersecting the lateral end 806. Each of the first and second edges 808, 810 is oriented diagonally with respect to the lateral end 806, e.g., angled with respect to the direction of gravity. In the illustrated embodiment, each of the first and second edges 808, 810 is angled outward from a top 812 to a bottom 814 of the groove 804. In some other embodiments, each of the first and second edges 808, 810 is angled inward from the top 812 to the bottom 814.

In some embodiments, the shape of the tongue piece 820 matches the shape of the groove 804. In some embodiments, the tongue piece 820 has a beveled shape configured to match the dovetail shape of the groove 804. The tongue piece 820 has a tongue body 822 having a first side 824a and a second side 824b. Each of the first and second sides 824a, 824b has first edges 828a, 828b and opposite second edges 830a, 830b. Each of the first and second edges 828, 830 is oriented diagonally with respect to a top 832 and a bottom 834 of the tongue body 822. In the illustrated embodiment, each of the first and second edges 828, 830 is angled outward from the top 832 to the bottom 834 such that the each of the first and second edges 828, 830 conforms to respective ones of the first and second edges 808, 810 of the groove 804. In some other embodiments, each of the first and second edges 828, 830 is angled inward from the top 832 to the bottom 834.

Referring to FIGS. 8A-8C, when the tongue piece 820 is inserted in the groove 804, contact between the upward-facing first and second edges 828, 830 of the tongue piece 820 with respective ones of the downward-facing first and second edges 808, 810 of the groove 804 forces the bottom 834 of the tongue piece 820 against the bottom 814 of the groove 804. The downward force on the tongue piece 820 secures the tongue piece 820 with a groove connector 816 without using fasteners and without having a work surface installed. Thus, the tongue piece 820 is configured to float between adjoining unit bodies without the use of fasteners enabling assembly and reconfiguration of modular storage systems of the present disclosure without using any tools or external hardware.

In some other embodiments, each of the first and second edges 828, 830 has a V-shape (FIG. 8D). In this embodiment, starting from a middle 836 of the tongue body 822, each of the first and second edges 828, 830 is angled inward toward the top and bottom 832, 834. In such embodiments, the groove 804 has a shape that corresponds to the shape of the tongue piece 820. In such embodiments, the tongue piece 820 is symmetrical between the top and bottom 832, 834 such that the tongue piece 820 can be installed in the groove 804 regardless of whether the top or bottom 832, 834 of the tongue piece 820 is facing upward.

In the illustrated embodiments, the tongue piece 200, 820 has a generally hexagonal profile when viewed from the top surface, and the groove 130, 430, 630, 730 has a corresponding shape. However, the tongue piece and corresponding groove are not so limited. That is, the tongue piece may have any shape suitable for connecting adjacent unit bodies via the correspondingly shaped groove. For example, the tongue piece may have a generally rectangular profile when viewed from the top surface. Alternatively, the tongue piece may be curved when viewed from the top surface such as having a generally oval or circular profile.

Embodiments of the present disclosure further relate to any one or more of the following paragraphs 1-40:

1. A modular storage system, comprising: first and second unit bodies configured to be connected together; and a tongue piece having first and second sides, each of the first and second sides having a shape corresponding to a groove formed in each of the first and second unit bodies, wherein the first side is secured in the groove of the first unit body, and wherein the second side is configured to be removably disposed in the groove of the second unit body for connecting the first and second unit bodies together.

2. The modular storage system according to paragraph 1, wherein the first and second unit bodies are connected end to end.

3. The modular storage system according to any one of paragraphs 1-2, wherein the first and second unit bodies are connected at least one of back to back or in a T shape.

4. The modular storage system according to any one of paragraphs 1-3, wherein each of the first and second unit bodies comprises opposite lateral ends each having a groove formed therein.

5. The modular storage system according to any one of paragraphs 1-4, wherein the grooves are formed in an upper surface of the first and second unit bodies.

6. The modular storage system according to any one of paragraphs 1-5, wherein each of the first and second unit bodies comprises a groove connector in each groove, and wherein the tongue piece has a tongue connector configured to releasably engage the groove connector.

7. A connection arrangement for two items, comprising: a groove formed in a surface of each item, each groove including at least one outwardly biased member constructed and arranged to retain a distal end of a tongue when the distal end is inserted into the groove, wherein a proximal end of the tongue is mountable in either groove, and wherein the distal end of the tongue is receivable in either groove.

8. The connection arrangement according to paragraph 7, wherein each of the proximal and distal ends of the tongue has a shape corresponding to each groove.

9. The connection arrangement according to any one of paragraphs 7-8, wherein each groove is formed in a side surface of each item.

10. The connection arrangement according to any one of paragraphs 7-9, wherein the tongue comprises a recess configured to receive the at least one outwardly biased member.

11. A modular storage system, comprising: a unit body having a first lateral end, a second lateral end opposite the first lateral end, and an upper surface extending between the first and second lateral ends, the unit body including: a first groove formed in the upper surface at the first lateral end, and a first groove connector in the first groove; and a tongue piece having a first side having: a shape corresponding to the first groove, and a tongue connector configured to releasably engage the first groove connector.

12. The modular storage system according to paragraph 11, further comprising a work surface configured to be removably placed on the upper surface of the unit body.

13. The modular storage system according to any one of paragraphs 11-12, wherein the upper surface of the unit body includes a plurality of pins extending therefrom, wherein the work surface includes a plurality of openings disposed in a unit body facing surface thereof, and wherein the plurality of openings are in registration with corresponding ones of the pins.

14. The modular storage system according to any one of paragraphs 11-13, wherein the first groove connector has a first contact surface extending in the direction of the upper surface.

15. The modular storage system according to any one of paragraphs 11-14, wherein the unit body has a lower surface opposite the upper surface, and wherein the unit body further comprises: a second groove formed in the lower surface at the first lateral end, and a second groove connector in the second groove.

16. The modular storage system according to any one of paragraphs 11-15, wherein the second groove connector has a second contact surface extending in the direction of the lower surface.

17. The modular storage system according to any one of paragraphs 11-16, wherein the unit body further comprises: a third groove formed in the upper surface at the second lateral end, and a third groove connector in the third groove.

18. The modular storage system according to any one of paragraphs 11-17, wherein the first groove connector is a ball plunger comprising a housing, an axially movable ball disposed in the housing, and a spring disposed between the housing and the ball, wherein the spring applies a biasing force to the ball to releasably engage the ball plunger with the tongue connector.

19. The modular storage system according to any one of paragraphs 11-18, wherein the unit body further comprises: a first recess formed in the first lateral end; and a first handle coupled to the unit body within the first recess, the first handle being movable between a folded position wherein the first handle is disposed entirely within the first recess and an extended position wherein the first handle extends away from the first lateral end.

20. The modular storage system according to any one of paragraphs 11-19, wherein the unit body has a lower surface opposite the upper surface, the unit body further comprising a plurality of casters attached to the lower surface, the plurality of casters being rotatable about an axis in the direction of gravity, and the plurality of casters being continuously disposed within a lateral footprint between the first and second lateral ends of the unit body.

21. The modular storage system according to any one of paragraphs 11-20, wherein the plurality of casters are lockable to prevent both linear and pivoting movement of the unit body.

22. The modular storage system according to any one of paragraphs 11-21, wherein the tongue piece includes a plurality of apertures, and wherein each of the plurality of apertures is configured to receive a corresponding fastener for securing the tongue piece to the unit body.

23. The modular storage system according to any one of paragraphs 11-22, wherein the tongue piece further comprises a second side having: a shape corresponding to the first groove, and a tongue connector configured to releasably engage the first groove connector.

24. The modular storage system according to any one of paragraphs 11-23, wherein the first side of the tongue piece is disposed in the first groove, wherein the second side of the tongue piece extends away from the first lateral end, and wherein the tongue connector of the second side is configured to releasably engage a groove connector of an adjoining unit body.

25. The modular storage system according to any one of paragraphs 11-24, wherein the unit body is a first unit body and wherein the tongue piece is a first tongue piece, the modular storage system further comprising: a second unit body spaced from the first unit body, the second unit body having a second tongue piece extending from a lateral end thereof; and a bridging work space extending between the first and second unit bodies, wherein the bridging work space is secured to each of the first and second tongue pieces.

26. The modular storage system according to any one of paragraphs 11-25, wherein the unit body is a first unit body, further comprising a second unit body configured to be connected to the first unit body, the first side of the tongue piece extending from a lateral end of the second unit body, the tongue piece being configured to releasably engage the first groove connector when the first side of the tongue piece is disposed in the first groove.

27. The modular storage system according to any one of paragraphs 11-26, wherein the tongue piece is integral with the second unit body.

28. A method of using a modular storage system, the method comprising: moving a first lateral end of a first unit body relative to a second opposing lateral end of a second unit body; engaging a tongue piece extending from the second lateral end with a groove formed in the first lateral end; and applying a pushing force above a threshold value for releasably engaging a groove connector of the groove with a tongue connector of the tongue piece to connect the first and second unit bodies.

29. The method according to paragraph 28, further comprising applying a pulling force above the threshold value to disconnect the first and second unit bodies.

30. The method according to any one of paragraphs 28-29, wherein engaging the tongue piece with the groove comprises sliding the tongue piece into the groove, the tongue piece having a shape corresponding to the groove for self-aligning the first and second unit bodies.

31. The method according to any one of paragraphs 28-30, further comprising attaching the tongue piece to the first unit body using a plurality of fasteners before engaging the tongue piece with the groove.

32. A tongue piece for a modular storage unit, the tongue piece comprising: a tongue piece body having a first and second side, each of the first and second sides having: a shape corresponding to a groove formed in a unit body of the modular storage unit; a plurality of apertures formed through the tongue piece body and extending between first and second opposite faces thereof; and a tongue connector configured to releasably engage a groove connector of the unit body.

33. A tongue piece for a modular storage unit, the tongue piece comprising: a tongue piece body having a first face, a second face opposite the first face, and first and second lateral edges extending between the first and second faces, the tongue piece body including: a plurality of depressions formed in each of the first and second faces; and a plurality of apertures formed through the tongue piece body and extending between the first and second faces.

34. The tongue piece according to paragraph 33, wherein the tongue piece has a hexagonal shape.

35. The tongue piece according to any one of paragraphs 33-34, wherein the plurality of depressions are disposed at a longitudinal center of the tongue piece body.

36. The tongue piece according to any one of paragraphs 33-35, wherein a longitudinal medial portion of each of the first and second faces is recessed relative to first and second longitudinal end portions thereof, and wherein the plurality of depressions are formed in the longitudinal medial portion.

37. The tongue piece according to any one of paragraphs 33-36, wherein a shape of the first and second longitudinal end portions is tapered relative to the longitudinal medial portion.

38. A modular storage system, comprising: a first unit body having a first lateral end, a second lateral end opposite the first lateral end, and an upper surface extending between the first and second lateral ends, the unit body including: a first groove formed in the upper surface at the first lateral end, and a first groove connector in the first groove; and a second unit body configured to be connected to the first unit body, the second unit body having a tongue piece extending from a lateral end thereof, the tongue piece having a first and second side, each of the first and second sides having: a shape corresponding to the first groove, and a tongue connector configured to releasably engage the first groove connector.

39. The modular storage system according to paragraph 38, wherein the tongue connector is configured to releasably engage the first groove connector when the tongue piece of the second unit body is disposed in the first groove.

40. The modular storage system according to any one of paragraphs 38-39, further comprising a second tongue piece.

While the foregoing is directed to embodiments of the present disclosure, other and further embodiments of the disclosure may be devised without departing from the basic scope thereof, and the scope thereof is determined by the claims that follow.

What is claimed is:

1. A modular storage system, comprising:
   a unit body having a first lateral end, a second lateral end opposite the first lateral end, and an upper surface extending between the first and second lateral ends, the unit body including:
      a first groove formed in the upper surface at the first lateral end, and
      a first groove connector in the first groove;
   a tongue piece having a first side having:
      a shape corresponding to the first groove, and
      a tongue connector configured to releasably engage the first groove connector; and
   a work surface configured to be removably placed on the upper surface of the unit body;
   wherein the upper surface of the unit body includes a plurality of pins extending therefrom, wherein the work surface includes a plurality of openings disposed in a unit body facing surface thereof, and wherein the plurality of openings are in registration with corresponding ones of the pins.

2. The modular storage system of claim 1, wherein the first groove connector has a first contact surface extending in the direction of the upper surface.

3. A modular storage system, comprising:
   a unit body having a first lateral end, a second lateral end opposite the first lateral end, and an upper surface extending between the first and second lateral ends, the unit body including:
      a first groove formed in the upper surface at the first lateral end, and
      a first groove connector in the first groove;
   a tongue piece having a first side having:
      a shape corresponding to the first groove, and
      a tongue connector configured to releasably engage the first groove connector;
   wherein the first groove connector is a ball plunger comprising a housing, an axially movable ball disposed in the housing, and a spring disposed between the housing and the ball, wherein the spring applies a biasing force to the ball to releasably engage the ball plunger with the tongue connector.

4. The modular storage system of claim 1, wherein the tongue piece includes a plurality of apertures, and wherein each of the plurality of apertures is configured to receive a corresponding fastener for securing the tongue piece to the unit body.

5. The modular storage system of claim 1, wherein the tongue piece further comprises a second side having:
   a shape corresponding to the first groove, and
   a tongue connector configured to releasably engage the first groove connector.

6. The modular storage system of claim 5, wherein the first side of the tongue piece is disposed in the first groove, wherein the second side of the tongue piece extends away from the first lateral end, and wherein the tongue connector of the second side is configured to releasably engage a groove connector of an adjoining unit body.

7. The modular storage system of claim 6, wherein the unit body is a first unit body and wherein the tongue piece is a first tongue piece, the modular storage system further comprising:
   a second unit body spaced from the first unit body, the second unit body having a second tongue piece extending from a lateral end thereof; and
   a bridging work surface extending between the first and second unit bodies, wherein the bridging work surface is removably secured to each of the first and second tongue pieces.

8. The modular storage system of claim 1, wherein the unit body is a first unit body, further comprising a second unit body configured to be connected to the first unit body, the first side of the tongue piece extending from a lateral end of the second unit body, the tongue piece being configured to releasably engage the first groove connector when the first side of the tongue piece is disposed in the first groove.

9. The modular storage system of claim 8, wherein the tongue piece is integral with the second unit body.

10. A method of using a modular storage system, the method comprising:
   attaching a tongue piece to a first unit body using a plurality of fasteners so that a portion of the tongue piece extends from a first lateral end of the first unit body;
   moving the first lateral end of the first unit body relative to a second opposing lateral end of a second unit body;
   engaging the portion of the tongue piece extending from the first lateral end with a groove formed in the second lateral end; and
   applying a pushing force above a threshold value for releasably engaging a groove connector of the groove with a tongue connector of the tongue piece to connect the first and second unit bodies.

11. The method of claim 10, wherein engaging the tongue piece with the groove comprises sliding the tongue piece into the groove, the tongue piece having a shape corresponding to the groove for self-aligning the first and second unit bodies.

12. The modular storage system of claim 1, wherein the first groove connector is a ball plunger comprising a housing, an axially movable ball disposed in the housing, and a spring disposed between the housing and the ball, wherein the spring applies a biasing force to the ball to releasably engage the ball plunger with the tongue connector.

13. The modular storage system of claim 1, wherein the unit body has a lower surface opposite the upper surface, and wherein the unit body further comprises:
   a second groove formed in the lower surface at the first lateral end, and
   a second groove connector in the second groove.

14. The modular storage system of claim 3, wherein the tongue piece includes a plurality of apertures, and wherein each of the plurality of apertures is configured to receive a corresponding fastener for securing the tongue piece to the unit body.

15. The modular storage system of claim 14, further comprising:
   a work surface configured to be removably placed on the upper surface of the unit body;
   wherein the upper surface of the unit body includes a plurality of pins extending therefrom, wherein the work surface includes a plurality of openings disposed in a unit body facing surface thereof, and wherein the plurality of openings are in registration with corresponding ones of the pins when the work surface is placed on the upper surface of the unit body.

16. The modular storage system of claim 3, wherein the unit body has a lower surface opposite the upper surface, and wherein the unit body further comprises:
   a second groove formed in the lower surface at the first lateral end, and
   a second groove connector in the second groove, wherein the second groove connector is a ball plunger similar to the first ball plunger.

17. The modular storage system of claim 3, wherein the unit body is a first unit body, further comprising a second unit body configured to be connected to the first unit body, the first side of the tongue piece extending from a lateral end of the second unit body, the tongue piece being configured to releasably engage the ball plunger when the first side of the tongue piece is disposed in the first groove.

18. The method of claim 10, wherein the groove connector is a ball plunger comprising a housing, an axially movable ball disposed in the housing, and a spring disposed between the housing and the ball, wherein the spring applies a biasing force to the ball to releasably engage the ball plunger with the tongue connector.

19. The method of claim 10, further comprising:
   removably placing a work surface on a first upper surface of the first unit body;
   wherein the first upper surface of the first unit body includes a plurality of pins extending therefrom, wherein the work surface includes a plurality of openings disposed in a unit body facing surface thereof, and wherein the plurality of openings are in registration with corresponding ones of the pins when the work surface is placed on the first upper surface of the first unit body.

20. The method of claim 10, wherein the tongue piece is a first tongue piece attached to an upper surface of the first unit body and extending from the upper surface, the method further comprising:
   attaching a second tongue piece to a lower surface of the first unit body so that a portion of the second tongue piece extends from the first lateral end and the lower surface of the first unit body;
   while engaging the portion of the first tongue piece with the groove formed in the second lateral end at an upper surface of the second unit body, engaging the portion of the second tongue with a second groove formed in the second lateral end at a lower surface of the second unit body.

\* \* \* \* \*